United States Patent
Tokie

(10) Patent No.: US 7,921,354 B2
(45) Date of Patent: Apr. 5, 2011

(54) COMPUTER-READABLE MEDIUM STORING PROGRAM FOR CONTROLLING ARCHIVING OF ELECTRONIC DOCUMENT, DOCUMENT MANAGEMENT SYSTEM, DOCUMENT MANAGEMENT METHOD, AND COMPUTER DATA SIGNAL

(75) Inventor: Katsuji Tokie, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 879 days.

(21) Appl. No.: 11/832,768

(22) Filed: Aug. 2, 2007

(65) Prior Publication Data

US 2008/0201552 A1 Aug. 21, 2008

(30) Foreign Application Priority Data

Feb. 21, 2007 (JP) .................. 2007-040437

(51) Int. Cl.
G06F 17/00 (2006.01)
G06F 17/20 (2006.01)
G06F 17/21 (2006.01)
G06F 17/22 (2006.01)
G06F 17/24 (2006.01)
G06F 17/25 (2006.01)
G06F 17/26 (2006.01)
G06F 17/27 (2006.01)
G06F 17/28 (2006.01)
G06F 7/00 (2006.01)

(52) U.S. Cl. . 715/229; 707/662; 707/665; 707/999.204; 707/E17.01

(58) Field of Classification Search .................. 715/229; 707/662, 665, E17.01; 711/204
See application file for complete search history.

(56) References Cited

U.S. PATENT DOCUMENTS

| 7,536,609 B2 * | 5/2009 | Nakamura et al. .............. 714/55 |
| 7,818,300 B1 * | 10/2010 | Kilday et al. ................. 707/662 |
| 2006/0053178 A1 * | 3/2006 | van Ingen et al. ............ 707/204 |
| 2006/0053181 A1 * | 3/2006 | Anand et al. ................. 707/204 |
| 2009/0216798 A1 * | 8/2009 | Wahlert et al. ............ 707/103 R |

FOREIGN PATENT DOCUMENTS

| JP | 546451 | 2/1993 |
| JP | 2003058638 | 2/2003 |
| JP | 2003216467 | 7/2003 |
| JP | 2008004041 | 1/2008 |

OTHER PUBLICATIONS

Notice of Grounds For Rejection issued on Feb. 27, 2008 in corresponding Japanese Application No. 2007-040437.

* cited by examiner

Primary Examiner — Stephen S Hong
Assistant Examiner — Nicholas R Hasty
(74) Attorney, Agent, or Firm — Gauthier & Connors LLP

(57) ABSTRACT

There is provided a computer-readable medium storing a program causing a computer to execute a process for controlling archiving of an electronic document, the program causing the computer to function as: a requirement memory that stores a document archive requirement for each rule; and an archive processor that judges, on the basis of the requirement memory, each document archive requirement corresponding to each rule to be applied to an electronic document to be archived, determines an archive mode which satisfies all of the judged document archive requirements, and executes a process to archive the electronic document in an archiving device in the determined archive mode.

5 Claims, 13 Drawing Sheets

| REQUIRE-MENT ID | RULE NAME | BASE SECTION | DOCUMENT TYPE | START CONDITION OF ARCHIVE PERIOD | LENGTH OF ARCHIVE PERIOD | APPLICATION START DATE | APPLICATION COMPLETION DATE | ARCHIVE MODE |
|---|---|---|---|---|---|---|---|---|
| 1 | PL LAW | PL LAW SECTION 5 | DOCUMENTS RELATED TO PRODUCT QUALITY, ETC. | CREATION OF DOCUMENT | 10 YEARS | JULY 1, 1995 | NOT DETERMINED | ... |
| 2 | TORTS LIABILITY | CIVIL LAW SECTION 724 | DOCUMENTS RELATED TO PRODUCT QUALITY, ETC. | DISAPPEAR-ANCE OF TARGET PRODUCT FROM MARKET | 20 YEARS | APRIL 1, 1897 | NOT DETERMINED | ... |
| 3 | IN-COMPANY RULE X | RULE X SECTION OO | DOCUMENTS RELATED TO PRODUCT QUALITY, ETC. | COMPLETION OF SALES OF TARGET PRODUCT | 50 YEARS | AUGUST 1, 1995 | NOT DETERMINED | ... |
| ... | ... | ... | ... | ... | ... | ... | ... | ... |

Fig. 3

| CATEGORY | ITEM | STRONG → | | → WEAK |
|---|---|---|---|---|
| INTEGRITY | ELECTRONIC SIGNATURE | ACCREDITED CA | PRIVATE CA | NONE |
| | TIME STAMP | ACCREDITED TSA | PRIVATE TSA | NONE |
| | SIGNATURE EXTENSION | YES | NO | |
| READABILITY | ARCHIVE FORMAT | LONG-TERM ARCHIVE SUPPORT (PDF/A, ETC.) | NO DESIGNATION (UNIQUE TO APPLICATION) | |
| | COMPRESSION | NO COMPRESSION/LOSSLESS COMPRESSION | LOSSY LOW COMPRESSION | LOSSY HIGH COMPRESSION |
| | RESOLUTION | HIGH RESOLUTION | MEDIUM RESOLUTION | LOW RESOLUTION |
| | ACCESS LEVEL | LIMITED TO SECTION | LIMITED TO COMPANY | NO LIMIT |
| CONFIDENTIALITY | CARRY OUT CONTROL | YES | NO | |
| | ENCRYPTION | YES | NO | |
| | LOG STORAGE | 10 YEARS | 1 YEAR | NO LOG NECESSARY |
| | ATTRIBUTE SEARCH | YES | NO | |
| SEARCHABILITY | ENTIRE TEXT SEARCH | YES | NO | |
| | ACCESS SPEED (CPU, STORAGE) | HIGH SPEED | MEDIUM SPEED | LOW SPEED |
| | ARCHIVE MEDIUM | ONLINE MEDIUM | OFFLINE MEDIUM | |

Fig. 4

| MODE ITEM NAME | REQUIREMENT ID. 1 | REQUIREMENT ID. 2 | REQUIREMENT ID. 3 |
| --- | --- | --- | --- |
| ELECTRONIC SIGNATURE | ACCREDITED CA | ACCREDITED CA | — |
| TIMESTAMP | ACCREDITED TSA | ACCREDITED TSA | — |
| SIGNATURE EXTENSION | YES | NO | — |
| ARCHIVE FORMAT | LONG-TERM ARCHIVE SUPPORT | — | LONG-TERM ARCHIVE SUPPORT |
| COMPRESSION | LOSSY LOW COMPRESSION | — | LOSSY HIGH COMPRESSION |
| RESOLUTION | MEDIUM RESOLUTION | — | HIGH RESOLUTION |
| ACCESS LEVEL | LIMITED TO SECTION | — | LIMITED TO COMPANY |
| CARRY OUT CONTROL | — | — | — |
| ENCRYPTION | — | — | — |
| LOG | 10 YEARS | — | 1 YEAR |
| ATTRIBUTE SEARCH | — | — | YES |
| ENTIRE TEXT SEARCH | — | — | YES |
| ACCESS SPEED (CPU STORAGE) | HIGH SPEED | — | LOW SPEED |
| ARCHIVE MEDIUM | ONLINE | — | — |

Fig. 5

| ARCHIVE MODE ID | ARCHIVE MODE 1 | ARCHIVE MODE 2 | ARCHIVE MODE 3 | ..... |
|---|---|---|---|---|
| ELECTRONIC SIGNATURE | ACCREDITED TSA | ACCREDITED CA | — | ..... |
| TIME STAMP | | ACCREDITED TSA | — | ..... |
| SIGNATURE EXTENSION | YES | NO | NO | ..... |
| ARCHIVE FORMAT | LONG-TERM ARCHIVE SUPPORT | LONG TERM ARCHIVE SUPPORT | LONG-TERM ARCHIVE SUPPORT | ..... |
| COMPRESSION | LOSSY LOW COMPRESSION | LOSSY LOW COMPRESSION | LOSSY HIGH COMPRESSION | ..... |
| RESOLUTION | HIGH RESOLUTION | HIGH RESOLUTION | HIGH RESOLUTION | ..... |
| ACCESS LEVEL | LIMITED TO SECTION | LIMITED TO SECTION | LIMITED TO COMPANY | ..... |
| CARRY OUT CONTROL | NO | NO | NO | ..... |
| ENCRYPTION | NO | NO | NO | ..... |
| LOG | 10 YEARS | 1 YEAR | 1 YEAR | ..... |
| ATTRIBUTE SEARCH | YES | YES | YES | ..... |
| ENTIRE TEXT SEARCH | YES | YES | YES | ..... |
| ACCESS SPEED (CPU, STORAGE) | HIGH SPEED | LOW SPEED | LOW SPEED | ..... |
| ARCHIVE MEDIUM | ONLINE | OFFLINE | OFFLINE | ..... |

Fig. 7

| DOCUMENT ID | DOCUMENT TYPE | CURRENT ARCHIVE MODE | APPLICATION START DATE OF ARCHIVE MODE | APPLIED ARCHIVE REQUIREMENT | PERIOD OF CURRENT ARCHIVE MODE |
|---|---|---|---|---|---|
| 000001 | DOCUMENTS RELATED TO PRODUCT QUALITY, ETC. | ARCHIVE MODE 2 | DECEMBER 1, 2006 | REQUIREMENT 1 : COMPLETION ON NOVEMBER 30, 2006<br>REQUIREMENT 2 : COMPLETION ON MARCH 31, 2023<br>REQUIREMENT 3 : COMPLETION ON OCTOBER 15, 2050 | MARCH 31, 2023 |
| ... | ... | ... | ... | ... | ... |
| 022983 | DOCUMENTS RELATED TO PRODUCT QUALITY, ETC. | ARCHIVE MODE 1 | JANUARY 11, 2007 | REQUIREMENT 1 : COMPLETION ON JANUARY 10, 2017<br>REQUIREMENT 2 : COMPLETION TIME OF ARCHIVE PERIOD IS UNDETERMINED<br>REQUIREMENT 3 : COMPLETION TIME OF ARCHIVE PERIOD IS UNDETERMINED | JANUARY 10, 2017 |
| ... | ... | ... | ... | ... | ... |

Fig. 9

COMPUTER-READABLE MEDIUM STORING PROGRAM FOR CONTROLLING ARCHIVING OF ELECTRONIC DOCUMENT, DOCUMENT MANAGEMENT SYSTEM, DOCUMENT MANAGEMENT METHOD, AND COMPUTER DATA SIGNAL

CROSS-REFERENCE TO RELATED APPLICATIONS

This application is based on and claims priority under 35 USC 119 from Japanese Patent Application No. 2007-040437, filed on Feb. 21, 2007.

BACKGROUND

1. Technical Field

The present invention relates to a computer-readable medium storing a program for controlling archiving of electronic documents, as well as to a document management system, a document management method, and a data signal.

2. Related Art

Recently, because of electronic document law and the Sarbanes-Oxley (SOX) act, various documents that had been mandated to be archived on paper can now be archived electronically. Regarding electronic archiving, archive requirements are defined by laws, public rules, or company rules in each organization. The archive requirements define, for example, requirement of means for proving integrity of the document (for example, electronic signature) and periods over which the document is to be archived. A company must archive and manage the electronic documents in order to satisfy such archive requirements.

SUMMARY

According to one aspect of the present invention, there is provided a computer-readable medium storing a program causing a computer to execute a process for controlling archiving of an electronic document. The program causes the computer to function as a requirement memory that stores a document archive requirement for each rule, and an archive processor that judges, on the basis of the requirement memory, each document archive requirement corresponding to each rule to be applied to an electronic document to be archived, determines an archive mode which satisfies all of the judged document archive requirements, and executes a process to archive the electronic document in an archiving device in the determined archive mode.

BRIEF DESCRIPTION OF THE DRAWINGS

Exemplary embodiment(s) of the present invention will be described in detail with reference to the following figures, wherein:

FIG. 3 is a diagram showing an example of contents of an archive requirement;

FIG. 4 is a diagram showing examples of items of an archive mode;

FIG. 5 is a diagram showing an example of a content of an archive mode of each archive requirement;

FIG. 7 is a diagram showing an example of a specific archive mode determined by a combination of archive requirements;

FIG. 9 is a diagram showing an example of a content of management information of an electronic document archived in a document-archiving device;

DETAILED DESCRIPTION

Figure 1:
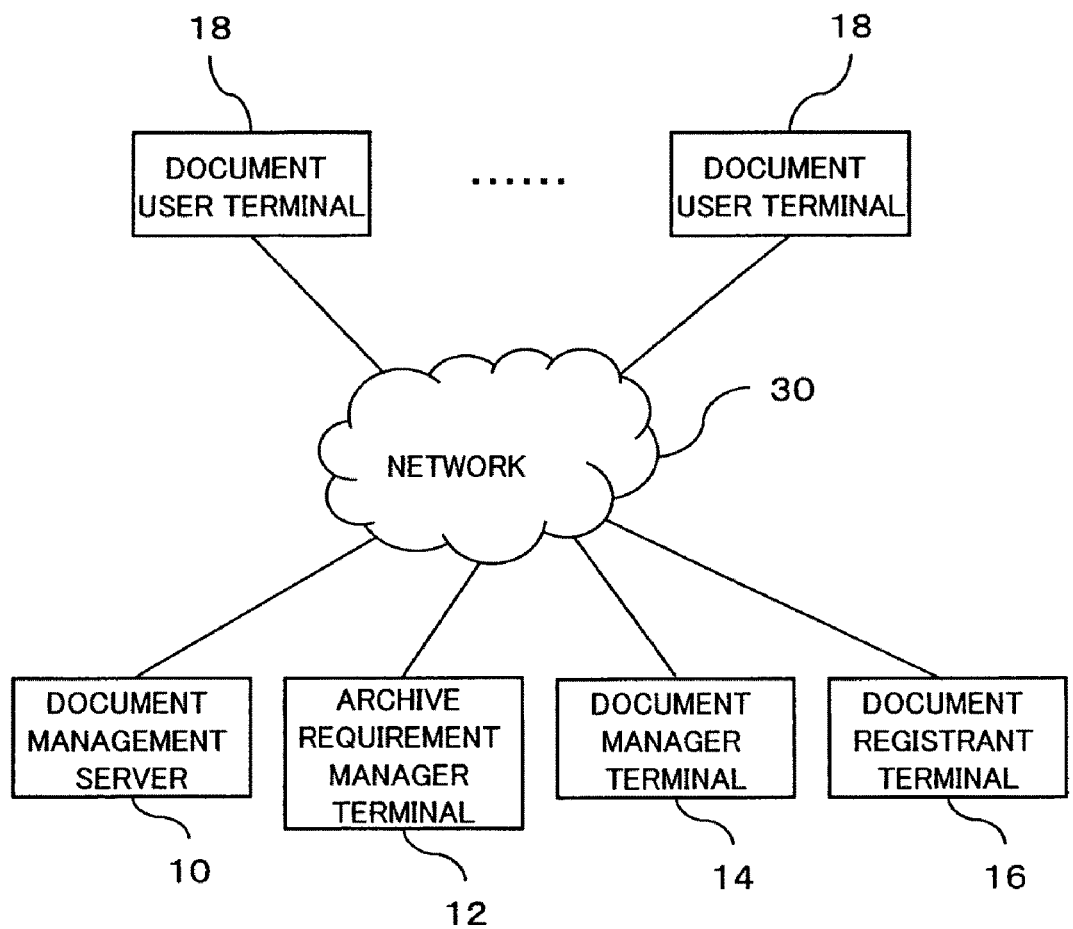
FIG. 1 is a diagram schematically showing an example system structure of an exemplary embodiment of the present invention.

An example of a system structure in an exemplary embodiment of the present invention will now be described with reference with FIG. 1. In the system of this example, a document management server 10, an archive requirement manager terminal 12, a document manager terminal 14, a document registrant terminal 16, a document user terminal 18, and an ERP (Enterprise Resource Planning) system or MIS (Management Information System) (not shown) are connected to a network 30. This system is used for archiving and managing an electronic document in a certain organization such as a company.

As the network 30, a LAN (local area network), a wide area data communication network such as the Internet, or a combination of these may be used.

The document management server 10 is a server which archives an electronic document which is mandated to be archived by laws and regulations or a public rule or a private rule within the company (hereinafter simply referred to as a "rule"). The document management server 10 has information of an archive requirement of an electronic document corresponding to each rule, and, when an electronic document to be archived is input, the document management server 10 archives the electronic document such that all of the archive requirements of rules applied to the electronic document are satisfied. The archive requirement will be described in more detail later.

The archive requirement manager terminal 12 is a terminal used by an archive requirement manager who has an authority to manage an archive requirement in the organization. An example of the archive requirement manager would be, for example, a staff member in a section of the organization who performs works for complying with the law, regulations, and rules. The archive requirement manager terminal 12 is used for registering, in the document management server 10, an archive requirement of an electronic document on the basis of a rule. It is also possible to update the archive requirement registered in the document management server 10 from the archive requirement manager terminal 12 when an existing rule has been amended. The document management server 10 may provide to the archive requirement management terminal 12 UI (User Interface) screen information for registering or updating the archive requirement. In this case, the archive requirement manager inputs various types of information for defining the archive requirement on the UI screen displayed on a display device of the archive requirement manager terminal 12, to register the archive requirement in the document management server 10.

The document manager terminal 14 is a terminal used by a document manager in the organization. The document manager is a person who has an authority to manage a document in the organization. The document manager may be, for example, selected for each business section handling a document, and, in this case, the document manager has a management authority only for the documents within the business section for which the document manager is responsible. The document manager accesses the document management server 10 from the document manager terminal 14, and, for example, checks or corrects contents of the electronic documents managed by the document manager and various types of management information corresponding to these documents. The management information of the electronic document may include, for example, information on a type of the document to be described later. The document management server 10 may provide to the document management terminal 14 a UI screen for the document manager. In this case, the document manager executes various processes for the document management on the UI screen displayed on a display device of the document manager terminal 14.

The document registrant terminal 16 is a terminal used by a document registrant who has an authority to register a document within the organization. The document registrant registers from the document registrant terminal 16 an electronic document to be archived in the document management server 10. The electronic document to be archived may exist within the document registrant terminal 16 or in another computer on the network 30. In the latter case, the document registrant terminal 16 can acquire, from the other computer on the network 30, an electronic document to be archived designated by the document registrant and send the acquired electronic document to the document management server 10. Alternatively, it is also possible to employ a configuration in which information indicating a storage location of the electronic document (such as, for example, a URL (Uniform Resource Locator)) is sent from the document registrant terminal 16 to the document management server 10 and the document management server 10 acquires the electronic document by reference to the information of the storage location. The document management server 10 may provide to the document registrant terminal 16 a UI screen for registering an electronic document, and the document registrant may execute registration processing by means of the UI screen on the document registrant terminal 16.

The document user terminal 18 is a terminal of a document user who has an authority to use an electronic document archived in the document management server 10. Use of the archived electronic document may include, for example, viewing the electronic document. Application of an editing process and an additional writing process, etc. to the archived electronic document is also considered "use" of the electronic document. In order to protect the electronic documents archived in the document management server 10 from tampering or the like, it is also possible to apply a control such that the original electronic document itself within the document management server 10 is not changed when an editing or additional writing process, or the like is executed in the document user terminal 18 on the electronic document. In this case, it is also possible to apply a control such that the electronic document to which a process such as editing and additional writing is applied is archived in the document management server 10 as an electronic document separate from the original electronic document. The document user can use only the electronic document for which the user has an authority to use, such as, for example, the business section to which the user belongs. The document management server 10 may provide to the document user terminal 18 a UI screen for the use of the electronic document, and the document user may use the document by means of the UI screen on the document user terminal 18.

In the above-described structure, the document management server 10 may provide the UI screens for the archive requirement manager terminal 12, the document manager terminal 14, the document registrant terminal 16, and the document user terminal 18 in a form of a web page, for example, but the exemplary embodiment is not limited to such a configuration. The hardware of the archive requirement manager terminal 12, the document manager terminal 14, the document registrant terminal 16, and the document user terminal 18 may be, for example, a typical personal computer (PC) or a typical workstation. Depending on the role of the user logging on the PC or the like, the function of the PC or the like as one of the terminals 12-18 is determined.

Figure 2:
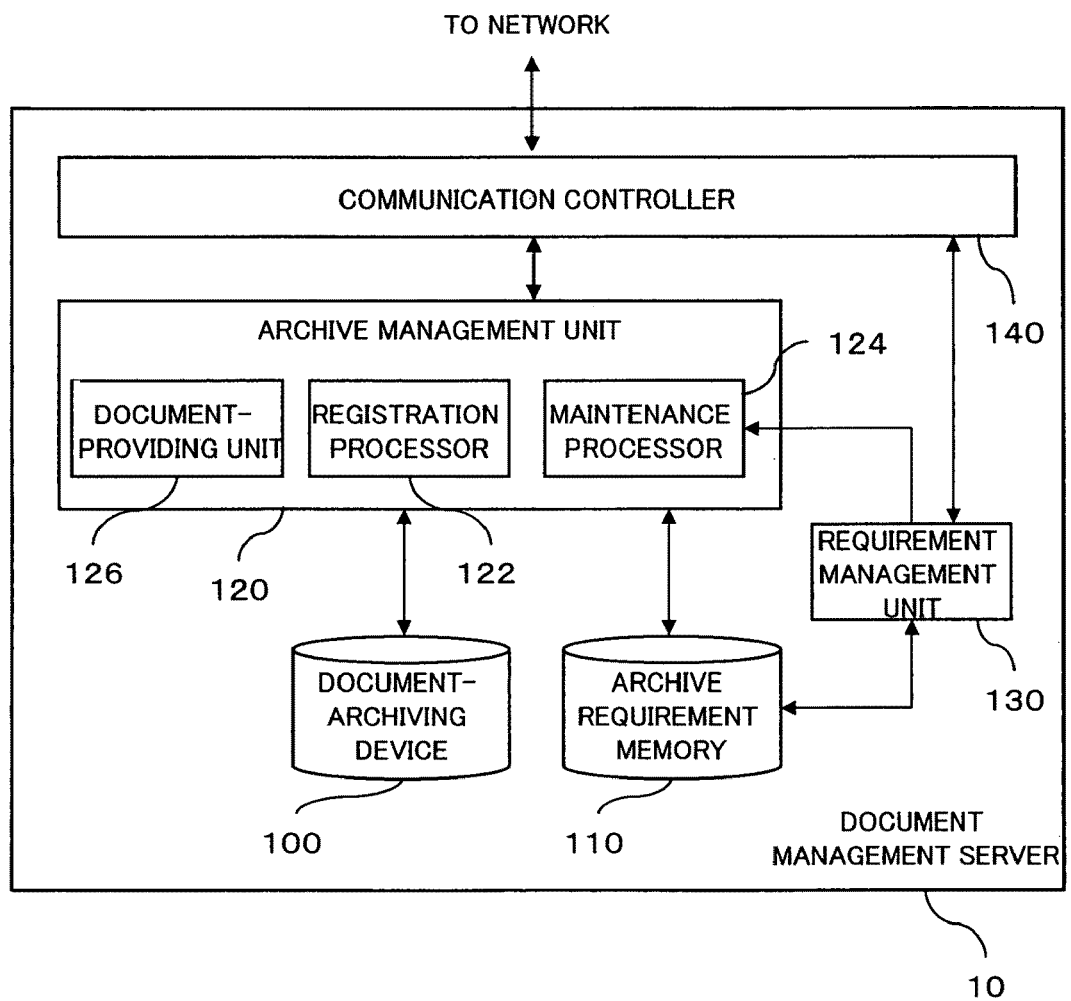
FIG. 2 is a diagram showing an example of an internal structure of a document management server.

Next, an example internal structure of the document management server 10 will be described with reference to FIG. 2. In this example configuration, the document management server 10 includes a document-archiving device 100, an archive requirement memory 110, an archive management unit 120, a requirement management unit 130, and a communication controller 140.

The document-archiving device 100 is a memory device which archives an electronic document. Examples of the memory device include, for example, a hard disk device and a device which writes an electronic document on a removable recording medium such as a disc. The document management server 10 may include multiple document-archiving devices 100 of the same kind or of different kinds.

The archive requirement memory 110 is a memory device which stores archive requirements for electronic documents, and may be realized by, for example, a hard disk drive. The archive requirement is information which defines an item required when the electronic document is archived. The archive requirement will be described later in more detail.

The archive management unit 120 manages such that an electronic document is archived while an archive requirement corresponding to the electronic document is satisfied. The archive management unit 120 includes a registration processor 122, a maintenance processor 124, and a document-providing unit 126. The registration processor 122 executes a process to satisfy an archive mode defined in the archive requirement when an electronic document is archived in the document-archiving device 100. The archive mode described herein may be considered as a form of archiving of the electronic document, and will be described later in more detail. The maintenance processor 124 re-evaluates the archive mode of the electronic document which is already archived in the document-archiving device 100, in accordance with elapse of time or a change or the like of the peripheral situation. When the archive mode determined in the re-evaluation differs from the current archive mode of the electronic document, the maintenance processor 124 executes a process such that the archive mode determined in the re-evaluation is satisfied by the electronic document. The document-providing unit 126 executes a process to provide to a user an electronic document archived in the document-archiving device 100. The document-providing unit 126 may have an access management function with respect to the archived electronic document. The document-providing unit 126 may have a function to record a log of an access of a user with respect to an archived electronic document. The document-providing unit 126 may provide to a user, for example, a search function for the electronic documents in the document-archiving device 100.

The requirement management unit 130 manages information of the archive requirement stored in the archive requirement memory 110 on the basis of an instruction from the archive requirement management terminal 12. Management of the archive requirement includes, for example, registration of an archive requirement in the archive requirement memory 110, and deletion and change of the registered archive requirement.

The transmission controller 140 controls data communication between the document management server 10 and the network 30. As the communication controller 140, for example, a network interface card may be used.

Next, an example of archive requirement data stored in the archive requirement memory 110 will be described by reference to FIG. 3. In the example configuration of FIG. 3, one row represents an archive requirement corresponding to one rule. In each piece of information of archive requirement, a "requirement ID" is identification information uniquely assigned to the archive requirement, a "rule name" is a name of the rule defining the archive requirement, and a "base section" is information for identifying one or more sections in the rule constituting a particular basis for the archive requirement. The information of the rule name and base section can be provided to a manager or a user who uses the archived electronic document, as information showing a basis for the archive mode of the electronic document. As the basis information, it is also possible to include information of the government agency responsible for the rule or the like in the archive requirement.

A "type of document" is information indicating a type of document from the viewpoint of the archive requirement, and the same archive requirement is applied to documents belonging to the same document type. Archive requirements based on multiple rules may be applied to documents belonging to one document type. In the example configuration of FIG. 3, three archive requirements of requirement IDs 1-3 are applied to a document type of "documents related to product quality, etc.". The document types used in the document management server 10 may be defined by the archive requirement manager. The document type of the document to be registered by the document registrant to the document management server 10 may be selected by the document registrant from among these document types. When an electronic document to be archived is created in a business process managed by a system such as a workflow management system and an ERP or MIS system and registered in the document management server 10, a document type may be registered in correspondence to the business process. In this case, the document created in the business process and for which registration is instructed is registered in the document management server 10 with a document type corresponding to the business process.

A "start condition of archive period" indicates a condition to start the archive period of an electronic document defined by the archive requirement. For example, occurrence of a particular event with respect to an archived document may be a start condition of an archive period. The event with respect to the document may be an event regarding the document itself or an event related to a tangible or intangible substance which is a target of the document. Examples of the former case include, for example, creation or revision of the document. Examples of the latter case include, for example, events such as start or completion of sales of a product which is a target of the document, events such as disappearance from the market, or start or end of provision of a service which is a target of the document.

A "length of archive period" is information which defines a length of an archive period of an electronic document defined by the archive requirement. The length of the period need not be in units of "years" as exemplified in the example configuration, and may be represented in a unit corresponding to the definition in the rule such as units of "days" and units of "months".

An "application start date" indicates a date on which the application of the archive requirement starts, and corresponds to, for example, a day when a rule corresponding to the archive requirement becomes effective or valid. An "application completion date" indicates a date on which application of the archive requirement is completed, and corresponds to, for example, a date on which the rule corresponding to the archive requirement is discarded or becomes invalid.

An "archive mode" is information which defines a method of management of the electronic document to be archived. The archive mode defines, for example, a data format of the electronic document to be archived, or content of a process to be applied when the electronic document is to be archived, or a content of protection on the system for the electronic document archived in the document-archiving device 100. An individual archive mode includes one or more items. Examples of the items of the archive mode are listed in FIG. 4.

In the example configuration shown in FIG. 4, the items of the archive mode are categorized into four types of requirements including "integrity", "readability", "confidentiality", and "searchability" (or "availability"). The requirements for integrity include, for example, that the archived electronic document is not tampered with or deleted or the ability to check whether the document has been tampered with. The requirements for readability include, for example, that the archived electronic document can be output (displayed on a screen or print output) in a format which can be read by a human. The requirements for confidentiality include, for example, that a measure is taken to inhibit access by a person who is not permitted to access an item recorded in the archived electronic document. The requirements for searchability include, for example, taking a measure to construct items in a systematic structure such that items recorded on an electronic document can be searched to a necessary degree.

FIG. 4 shows examples of items of an archive mode belonging to the categories and example values of the items. The value which can be taken by each item is arranged in decreasing order of strength of the requirement.

FIG. 4 shows "electronic signature", "time stamp", and "signature extension" as items related to integrity.

The item "electronic signature" is an item which defines a requirement for an electronic signature on an electronic document to be archived. In the illustrated example, the item "electronic signature" may take one of values of "accredited CA", "private CA", and "none". The value "accredited CA" means that an electronic signature using a public key certificate (hereinafter simply referred to as "certificate") issued by an accredited CA (Certification Authority) must be attached to the electronic document to be archived. An "electronic signature using a certificate" means an electronic signature which is created by an encryption process using a private key which forms a pair with a public key certified by the certificate. The accredited CA is a CA which is publicly accredited such as that defined in the laws and regulations. Examples of an accredited CA include, for example, CAs managed by a government organization and CAs managed by a certain company which is publicly accredited and which provides a certificate issuance service. The value "private CA" means that an electronic signature using a certificate issued by a private CA must be attached on the electronic document to be archived. A private CA is a CA which is not publicly accredited, and examples of the private CAs include, for example, CAs provided and managed by the organization operating the document management server 10 in accordance with a private standard. The value "none" means that no electronic signature is to be attached to the electronic document to be archived. In the document management server 10, information which identifies the accredited CA and the private CA is registered.

The item "time stamp" is an item which defines a requirement related to attachment of a time stamp on the electronic document to be archived. In the illustrated example, the item "time stamp" may take one of three values including an "accredited TSA", a "private TSA", and "none". The value "accredited TSA" means that a time stamp of an accredited TSA (Time Stamp Authority) must be applied to the electronic document to be archived. The accredited TSA is a TSA which is publicly accredited. The value "private TSA" means that a time stamp of a private TSA must be attached to the electronic document to be archived. The private TSA is a TSA which is not publicly accredited, and examples of the private TSA include, for example, a TSA privately provided and operated by the organization operating the document management server 10. The value "none" means that no time stamp needs to be attached to the electronic document to be archived. In the document management server 10, information which identifies the accredited TSA and the private TSA is registered.

A validity period is set for the certificate used in the electronic signature, and the integrity of the electronic document cannot be assured with an electronic signature using a certificate whose validity period has elapsed. Therefore, there are proposed signature extension techniques which extend the validity of the electronic signature beyond the validity period of the certificate used in the electronic signature. The item "signature extension" is an item which defines whether or not such a signature extension can be applied to the electronic signature attached to the electronic document to be archived.

FIG. 4 also shows, as an example of items related to readability, items of "archive format", "compression", and "resolution".

The item "archive format" is a requirement which defines a data format of an electronic document to be archived. FIG. 4 shows, as values of the item "archive format", two values including a value of "long-term archive support (format)" and a value of "no designation". The long-term archive support format is a format publicly accredited as a format for a long term archiving on the basis of laws and regulations or the like, and examples of the long-term archive support format include, for example, PDF/A (PDF/Archive: ISO/DIS 19005-1). The value "no designation", on the other hand, means that the format for archiving is not defined.

The item "compression" is a requirement which defines a requirement of a data compression to be applied on the electronic document to be archived. FIG. 4 shows, as example values of the item "compression", four values including a value of "no compression", a value of "lossless compression", a value of "lossy low compression", and a value of "lossy high compression". The value "no compression" means that the electronic document is to be archived without compression and the value "lossless compression" means that the electronic document is to be compressed using a lossless compression algorithm and archived. The values of "lossy low compression" and "lossy high compression" mean that the electronic document is to be compressed using a lossy compression algorithm and archived, with the latter meaning compression at a higher compression rate than the former. The document management server 10 has a compression algorithm for the "lossless compression" and a compression algorithm for the "lossy low compression" and "lossy high compression".

The item "resolution" is a requirement which defines a resolution of an electronic document to be archived. FIG. 4 shows three values of "high resolution", "medium resolution", and "low resolution". In the document management server 10, specific vales of the resolutions of high, medium, and low are registered. Resolution is merely one example of a parameter for defining an image quality of the electronic document. There may be other items related to the image quality parameter such as, for example, a number of tone levels.

FIG. 4 shows, as items related to confidentiality, items of "access level", "carry out control", "encryption", and "log storage".

The item "access level" is a requirement which defines a level of an access limitation for the archived electronic document. FIG. 4 shows three stages including "limited to section", "limited to company", and "no limit". "Limited to section" is a limitation to permit access to the staff of the section to which the registrant registering the electronic document in the document management server 10 belongs, and "limited to company" is a limitation to permit access to all personnel of the company operating the document management server 10, not limited to the section. "No limit" means that no access limitation is to be applied.

The item "carry out control" is an item which defines a requirement of carry out control of the archived electronic document. Carry out control is a control for a carry out operation of an electronic document from the document management server 10 to the outside. Examples of the control include, for example, prohibiting storage, of a document archived in the document management server 10, in a local environment such as the document user terminal 18 or prohibition of writing the document on a transportable recording medium. FIG. 4 shows, as example values of the item "carry out control", two values of "yes" and "no". The former means that the carry out control is to be applied and the latter means that the carry out control is not to be applied. The system of the exemplary embodiment including the document management server 10 has a program for the carry out control.

The item "encryption" is an item which defines a requirement for encryption of an electronic document to be archived. In the example configuration, the values of this item include two values of "yes" (indicating that the electronic document is to be encrypted) and "no" (indicating that no encryption is to be applied). When the value is "yes", the document management server 10 archives an electronic document to be archived after an encryption is applied by means of a predetermined encryption algorithm. Alternatively, it is also possible to set more detailed stages such as providing stages for the strengths of the encryption key.

The item "log storage" is an item which defines a requirement for storage of a log for an access by a user on the archived electronic document. FIG. 4 exemplifies a length of a period during which the log is to be stored as a value for "log storage". For example, when a period of log storage for a certain electronic document is 10 years, the access log for the electronic document is to be stored for 10 years from the time of recording of the log.

FIG. 4 shows, as items related to searchability, "attribute search", "entire text search", "access speed", and "archive medium".

The item "attribute search" is an item which defines whether or not a search using attribute information can be performed for archived electronic documents. The attribute information of an electronic document includes, for example, a creator of the electronic document, creation date and time, registrant, registration date and time, and document type.

The item "entire text search" is an item which defines whether or not an entire text search is to be allowed for archived electronic documents.

The item "access speed" is an item which defines a requirement related to an access speed for archived electronic documents. The access speed is determined by a hardware performance of the document-archiving device 10 which archives the electronic documents, performance of a CPU (Central Processing Unit) of the document management server 10, etc. For example, when the document management server 10 has a document-archiving device 100 which is fast and expensive and a document-archiving device 100 which is slow and inexpensive, the operation cost of the server 10 as a whole can be reduced by archiving the electronic document in the former device when the required access speed is fast and in the latter device when the required access speed is slow.

The item "archive medium" is an item which defines a medium in which the electronic documents are archived. FIG. 4 shows, as the values of the item, "online medium" and "offline medium". The online medium is a fixed recording medium which is built into the document management server 10. An example of the online medium is a hard disk drive. The offline medium is a recording medium which is removable from a document management server 10, and examples of the offline medium include a writable disk which conforms with a CD (Compact Disc) standard and a DVD (Digital Versatile Disc) standard. The document management server 10 may include both a document-archiving device 100 which reads and writes from and to an online medium and a document-archiving device 100 which reads and writes from and to an offline medium.

The document management server 10 may include a system which manages a location of the offline medium. This system records information for identifying a storage location of each offline medium and information for identifying in which offline medium each electronic document is archived. The storage location of the offline medium may be manually input and designated by the manager, or may be recorded by the system, by performing the storage operation itself of the offline medium by the system.

Items of the archive mode have been described with reference to FIG. 4. The archive mode in individual archive requirement is represented by a combination of the values of the items. The items and the values of the items illustrated in FIG. 4 are only exemplary. For example, it is also possible to provide an item which defines whether or not the electronic document itself can be discarded, in addition to the exemplified items. When the rule can be satisfied with the text content of the electronic document, and does not require the electronic document itself, the electronic document itself may be discarded and the text content may be archived. Alternatively, it is also possible to provide, as another item, an item indicating a period of backup of the data of the archived electronic document and an item which indicates whether the document archiving device 100 must be constructed in a redundant configuration or in a non-redundant configuration.

Referring back to FIG. 3, FIG. 3 exemplifies three archive requirements represented by requirement IDs 1-3, targeted to a document type "documents related to product quality, etc.". For the purpose of simplifying the description, an archive requirement having a requirement ID of n (where n is an integer) will hereinafter referred to as "archive requirement n". The archive requirements 1, 2, and 3 are based on a ruled in PL (Product Liability) law, a rule in torts liability in civil law, and an in-company rule, respectively. FIG. 5 shows an example of contents of the archive mode included in these archive requirements. In FIG. 5, an item without a value means that there is no rule for that item. The example configuration shown in FIGS. 3 and 5 is merely an example. The archive requirements for the "documents related to product quality, etc." are not limited to those shown in FIGS. 3 and 5. Alternatively, it is also possible to register in the archive requirement memory 110 archive requirements related to other document types.

Figure 6:
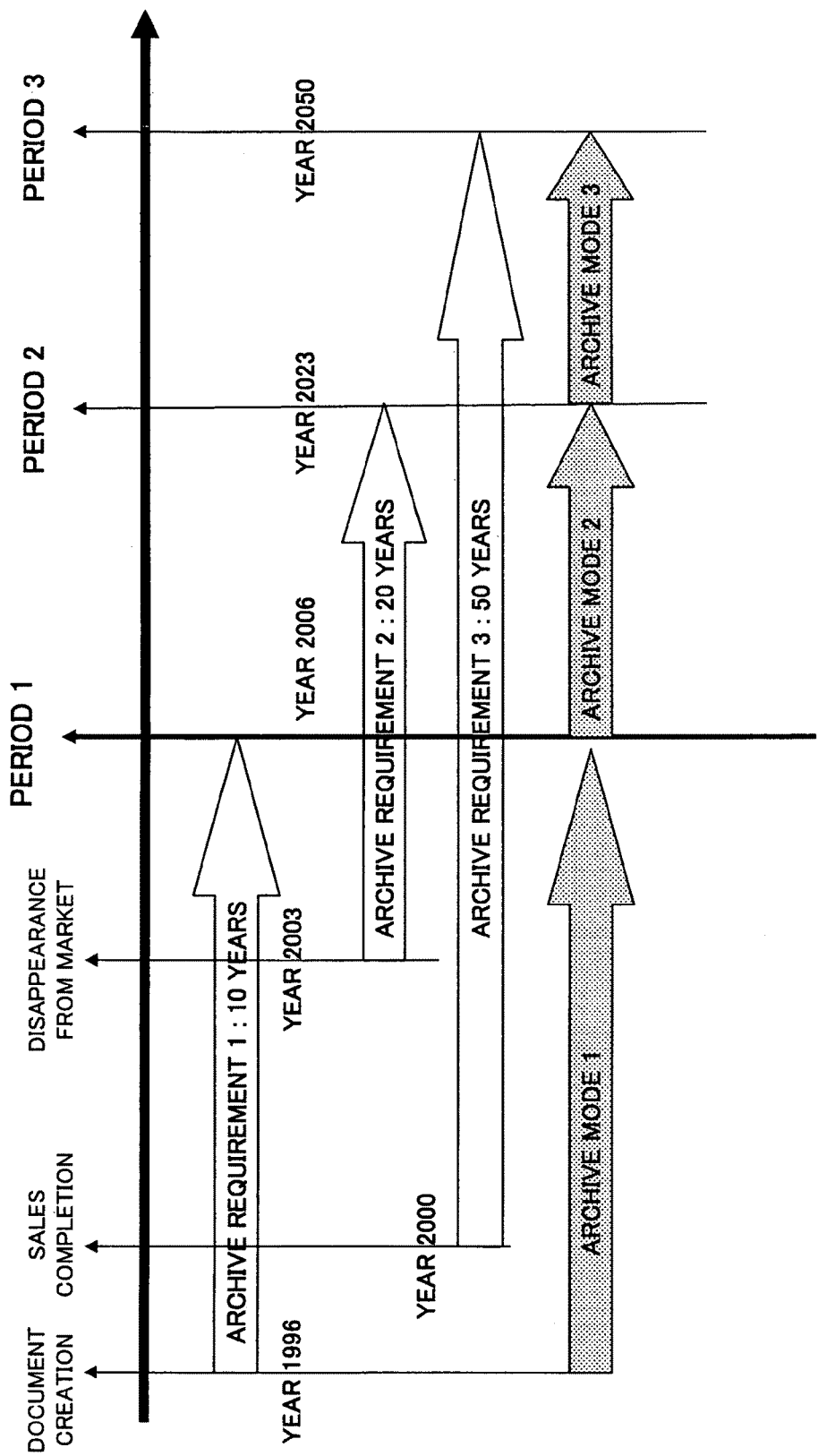
FIG. 6 is a diagram showing a specific example of transition of an archive requirement applied to an electronic document.

A method of archiving and managing electronic document in the exemplified embodiment will now be described by reference to a specific configuration. FIG. 6 exemplifies a temporal transition of the archive requirement applied to an electronic document corresponding to "documents related to product quality, etc.". The archive requirements to be applied are those shown in FIG. 3. The example configuration of FIG. 6 exemplifies a case in which an electronic document related to a certain product is created and registered in the document management server 10 in the year 1996, sales of the product was completed in the year 2000, and the product disappeared from the market in the year 2003. In such a case, the archive requirement 1 based on the PL law is applicable to the electronic document for 10 years from the time of registration of the document in the year 1996, the archive requirement 3 based on the in-company rule is applicable to the electronic document for 50 years from the time of completion of sales of the product in the year 2000, and the archive requirement 2 based on the rule of delinquency liability of civil law is applicable to the electronic document for 20 years from the time of disappearance of the product from the market in the year 2003. As shown in FIG. 6, there are periods in which multiple archive requirements are applied to an electronic document in an overlapping manner. In consideration of this, in the exemplary embodiment, the archive mode of the electronic document is basically controlled such that all of the archive requirements applied to the electronic document are satisfied.

Here, there may be items in the archive mode in which an item value defined in an archive requirement which is applied later is stricter. For such an item, if the looser requirement is applied first, it may be impossible to change to a stricter requirement at a later time. For example, if the data content of the electronic data is converted in a lossy manner, the original data content of the electronic document cannot be recovered, and, even if a stricter requirement is later applied, the requirement cannot be satisfied. For example, when the electronic document is compressed in a lossy manner, even if "no compression" or lossless compression is required in an archive requirement which is applied later, such a requirement cannot be satisfied. "No compression" and lossless compression requires that the original electronic document can be recovered. Similarly, when a resolution of an electronic document is once reduced to a low resolution, even if a high resolution is later required, such a requirement cannot be satisfied. Regarding electronic signature and time stamp also, once a private CA or a private TSA is used, the integrity in view from the public cannot be assured after the use of the private CA or private TSA.

In consideration of these situations, in the exemplary embodiment, all archive requirements that may be applied to the electronic document at the time of or after the determination of the archive mode of the electronic document are considered, and a strictest item value among all archive requirements is employed for each item of the archive mode.

When such a method is employed, in the example configuration of FIG. 6, at the time of creation and registration of the electronic document in the year 1996, the archive mode 1 which satisfies all of the archive requirements 1-3 illustrated in FIGS. 3 and 5 is applied to the electronic document.

Here, because the archive period defined in the archive requirement 1 is 10 years, after 10 years have elapsed from the time of registration of the electronic document (that is, after the period 1 in FIG. 6), the archive requirement 1 does not need to be considered. When the number of archive requirements to be considered is reduced, the minimum archive mode which satisfies all of the archive requirements is loosened. Therefore, even after the electronic document is archived, by changing the archive mode to a loosened archived mode at the time of reduction of the number of archive requirements to be considered for the electronic document, it is possible to reduce the load imposed on the system. For example, if the compression rate of the electronic document to be archived can be increased, the capacity of the document-archiving device 100 can be reduced. Similarly, when the storage period of the access log can be shortened, the storage capacity for the log storage can be reduced.

In consideration of this, in the exemplary embodiment, the archive mode of an electronic document is re-evaluated at the time the application period (that is, completion time of the archive period) of the archive requirement forming a basis for determining the archive mode of the electronic document is reached. For example, in the example configuration of FIG. 6, as a result of re-evaluation at the time the period 1 is reached, the archive mode applied to the electronic document changes to the archive mode 2. The archive mode 2 must satisfy archive requirements 2 and 3, but does not need to satisfy the archive requirement 1.

In the example configuration of FIG. 6, because the archive period defined by the archive requirement 2 is 20 years (the year 2023) from the time of disappearance from the market of the target product (the year 2003), the archive mode is again re-evaluated at that time (that is, at the period 2 shown in FIG. 6). As a result, the archive mode of the electronic document is changed to the archive mode 3 which only satisfies the archive requirement 3 after the period 2.

After 50 years has been elapsed (the year 2050; that is, at the period 3 in FIG. 6) after the completion of sales of the target product (the year 2000) which is the archive period defined by the archive requirement 3, there is no archive requirement to be applied to the electronic document. After expiration, in this manner, of all of the archive requirements to be applied, the electronic document may be deleted or discarded.

FIG. 7 shows contents of the above-describe archive modes 1-3. As can be understood from FIG. 7, in the archive mode 1, for example, the strictest value is employed as the value of each item in archive requirements 1-3 exemplified in FIG. 5.

In the example configuration described above, all of the archive requirements to be applied after the time of determination of the archive mode are considered for all items in the archive mode, but this is only exemplary. Alternatively, for example, it is also possible to employ a configuration in which only the archive requirements to be actually applied at the time of determination of the archive mode are considered for items in the archive mode in which there is no problem in switching to a stricter condition after a looser condition is once employed. In this case, information, for each item of archive requirement, indicating whether or not the item should consider the archive mode to be applied in the future is registered in the document management server 10.

Next, a content of processes of the units 122 126 in the archive management unit 120 will be described in more detail. First, the process of the registration processor 122 will be described with reference to FIG. 8.

Figure 8:
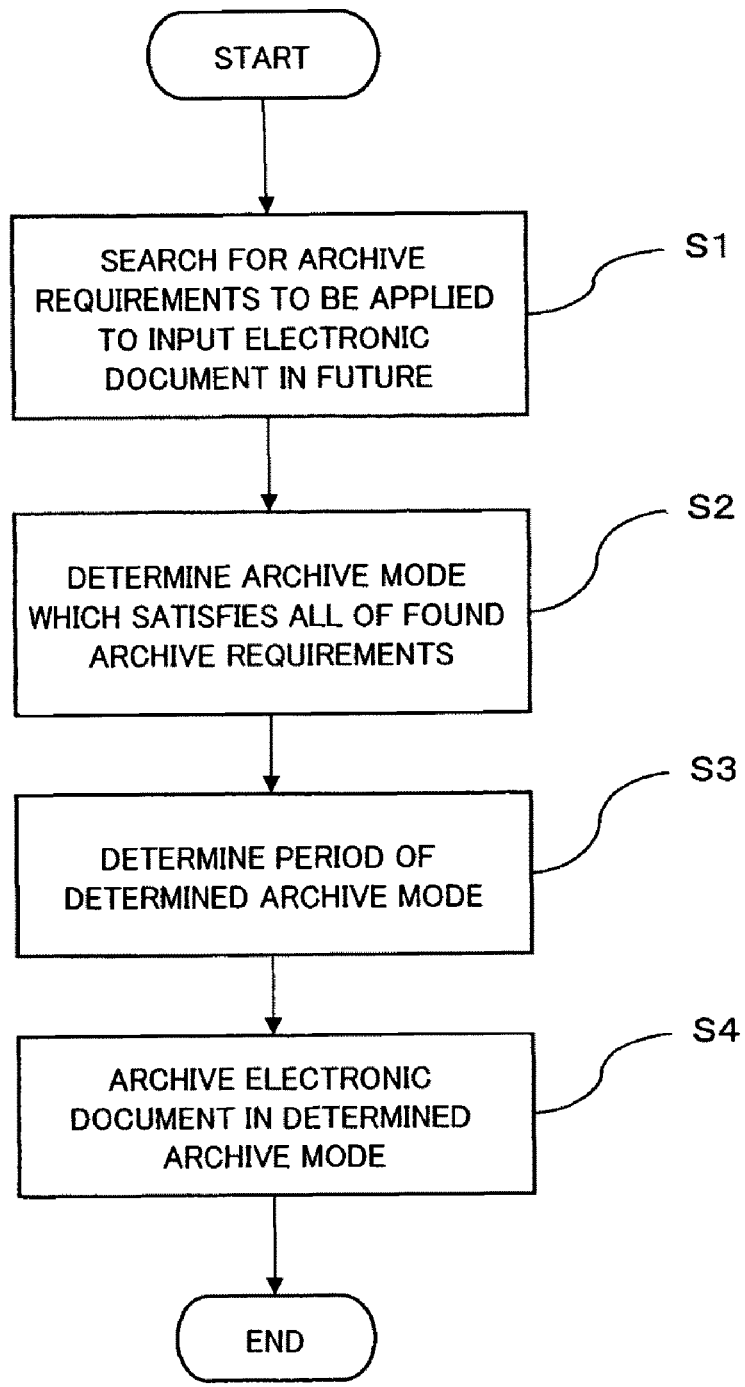
FIG. 8 is a flowchart showing an example of a process in a registration processor when an electronic document is newly registered.

When a registration request of an electronic document is received from the document registrant terminal 16, the registration processor 122 executes the process procedure of FIG. 8. In this procedure, the registration processor 122 first searches the archive requirement memory 110 for all archive requirements that may be applied to the electronic document in the future (S1). In the archive requirement memory 110, information indicating contents of the archive requirements exemplified in FIGS. 3 and 5 and information indicating the content of the items of the archive mode exemplified in FIG. 4 are registered in advance. The determination of which archive requirement may be applied to the electronic document is made on the basis of the document type of the electronic document. For example, it is possible to configure the system such that the document registrant designates the document type of the electronic document when the document registrant designates the electronic document to be registered in the document registrant terminal 16. Information on the choice of the document type may be set in the document registrant terminal 16 in advance or may be provided from the document management server 10. In the latter case, the information on the choice may be incorporated in the screen information (for example, a web page) for UI (user interface) of the document registration operation. Of the choices, the information indicating the document type selected by the document registrant is transmitted from the document registrant terminal 16 to the document management server 10 along with information of the electronic document to be registered. The registration processor 122 searches the archive requirements registered in the archive requirement memory 110 for an archive requirement having a value of the item "document type" matching the document type designated from the document registrant terminal 16.

When there is an archive requirement based on a rule which is not in effect at the time of registration of the electronic document or an archive requirement based on a rule which is already abolished, these archive requirements are removed from the search result. For example, it is possible to determine that the archive requirement is not to be applied to the electronic document when the registration time of the electronic document is prior to the "application start date" of the archive requirement or after the "application completion date" of the archive requirement.

In step S1, archive requirements which do not satisfy the "start condition of archive period" are also searched, because such an archive requirement may be applied in the future. Whether or not an event has occurred, such as completion of sales of the target product of the electronic document or the disappearance of the product from the market, can be known, for example, by the archive management unit 120 periodically inquiring the system which manages information of the products (such as, for example, ERP or MIS system) in the company which uses the document management server 10, of the status of the target product. By archiving, in the document-archiving device 100, identification information of a target of the electronic document (for example, the target product) in correspondence to the electronic document, it is possible for the archive management unit 120 to use the identification information for inquiry. When it is determined as a result of such an investigation that a "start condition of archive period" in an archive requirement applied to an already-archived electronic document is satisfied, the archive management unit 120 calculates the completion time of the archive period mandated by the archive requirement, and stores the information of the completion time in correspondence to the electronic document.

In the process of step S1, for example, when an electronic document corresponding to a type of "documents related to product quality, etc." is registered in the document management server 10 at a certain point of time in the year 1996, the archive requirements 1-3 exemplified in FIGS. 3 and 5 are searched as archive requirements that may be applied to the electronic document in the future.

In the above description, there is shown a case in which the document registrant designates the document type of the electronic document to be registered, but this is only exemplary. When, for example, the electronic document already includes information of the document type, or the document type can be automatically determined from the content of the electronic document or from the attribute information (for example, the creator of the electronic document to be registered or storage location in which the electronic document to be registered is stored), the document registrant does not need to designate the document type.

When archive requirements which may be applied to the electronic document in the future are identified in step S1, the registration processor 122 determines an archive mode which satisfies all of the archive requirements (S2). In the process of step S2, for example, a strictest value among the values of the items defined in each archive requirement may be selected for each item of the archive mode. Because information indicating a relative relationship of strengths (that is, strictness as a requirement) of the values of the archive mode items as shown in FIG. 4 is registered in the archive requirement memory 110, the process can be performed by reference to this information in step S2. For example, in the case of the example configuration of FIG. 6, at the time of registration of the electronic document (in the year 1996), the archive mode 1 shown in FIG. 7 would be determined as the archive mode for the electronic document.

Next, the registration processor 122 determines a period of the archive mode determined in step S2 (S3). For example, among the completion times of the archive periods defined in the archive requirements identified in step S1, the earliest completion time may be determined as the period of the archive mode. For example, in the example configuration of FIG. 6, at the time of registration of the electronic document in the year 1996, of the archive requirements 1-3 identified in step S1, events that form a basis for start of the archive period have not yet occurred for archive requirements 2 and 3, and, thus, the archive period can be determined only for the archive requirement 1. The completion time of the archive requirement 1 in this case would be 10 years from the time of registration, and, thus, a date of the "period 1" corresponding to a time of 10 years after the registration is determined in step S3. The period determined in step S3 is used as a determination base of a timing of the re-evaluation of the archive mode of the electronic document.

Then, the registration processor 122 archives the electronic document to be registered in the document-archiving device 100 in accordance with the archive mode determined in step S2 (S4). In step S4, the registration processor 122 executes, for example, the following process.

When it is defined in the archive mode determined in step S2, for example, that an electronic signature must be attached and a requirement of the electronic signature is defined in the archive mode, the registration processor 122 determines whether or not an electronic signature conforming to the item is attached to the electronic document. For example, when the archive mode 1 of FIG. 7 is applied, the registration processor may determine whether or not an electronic signature which uses a public key certificate of the document registrant issued by an accredited CA is attached to the electronic document. When the electronic signature conforming to the item is not attached, the registration processor 122 may transmit a message for prompting attachment of a conforming electronic signature to the document registrant terminal 16 to prompt an electronic signature. As an alternative method, it is also possible to employ a configuration in which the UI program for document registration in the document registrant terminal 16 transmits to the registration processor 122 a document type of the electronic document to be registered designated by the document registrant, the registration processor 122 returns a requirement for an electronic signature corresponding to the document type, and the UI program attaches the electronic signature satisfying the requirement on the electronic document and transmits the electronic document to the registration processor 122.

When there is an item of time stamp in the archive mode determined in step S2, the registration processor 122 may execute a process for attaching a time stamp which satisfies the item on the electronic document to be registered. For example, when a time stamp of an accredited TSA is a requirement, the registration processor 122 transmits a digest of the electronic document to the accredited TSA to acquire time stamp data, and attaches the time stamp data on the electronic document.

Similarly, the registration processor 122 executes processes such as format conversion, data compression, encryption, and resolution conversion on the electronic document in order to achieve an archive format, a compression method, an encryption method, and a resolution defined in the archive mode determined in step S2.

In the items described above, a process involving data conversion and data attachment is executed on the electronic document to be registered. The registration processor 122 applies the process defined in the item on the electronic document to be registered, and archives the processed electronic document in the document-archiving device 100. During the archiving, the registration processor 122 archives the electronic document in a document-archiving device 100, among the document-archiving devices 100 of the document management server 10, which satisfies the requirements of the access speed and archive medium defined in the archive mode determined in step S2.

If the archive mode determined in step S2 defines that "entire text search possible", the registration processor 122 extracts from the data of the electronic document information for entire text search (for example, text information representing a text content of the electronic document), and archives the information, for example, in the document-archiving device 100 in correspondence to the electronic document. When the archive mode defines that "attribute search possible", the registration processor 122 acquires the attribute information of the electronic document from within the electronic document or from the document registrant terminal 16, and archives the acquired attribute information, for example, in the document-archiving device 100 in correspondence to the electronic document.

In step S4, the registration processor 122 archives the information of the archive mode applied to the electronic document archived in the document-archiving device 100 in, for example, the document-archiving device 100 in correspondence to the electronic document. Among the items of the archive mode, there are items related to continuous management after the archiving such as signature extension, access level, carry out control, and log storage. Regarding these items of the archive mode, the archive management unit 120 manages to satisfy the requirements defined by the values, by referring to the values of the items of the archive mode archived in correspondence to the electronic document. For example, when a signature extension is a requirement, the archive management unit 120 executes a predetermined signature extension process before expiration of the validity period of the public key certificate which is used for the electronic signature. In addition, when an electronic document is requested by the document user terminal 18, the document-providing unit 126 in the archive management unit 120 determines whether or not the requested electronic document may be provided, on the basis of requirements of access level and carry out control corresponding to the electronic document.

FIG. 9 shows an example content of management information archived in the document-archiving device 100. One row of a table shown in FIG. 9 shows a management information record corresponding to one archived electronic document. A "document ID" is identification information of the electronic document. The management information corresponding to the archived electronic document is searched by reference to the document ID of the electronic document. A "document type" is a type of the electronic document. A "current archive mode" is identification information of the archive mode currently applied to the electronic document. The specific content of the archive mode may be archived in correspondence to the identification information. An "application start date of archive mode" indicates a date when the application of the current archive mode is started. An item of "applied archive requirement" includes a requirement ID of each archive requirement which is currently applied or which was applied in the past on the electronic document and information of the completion time of the archive period of the electronic document defined by each requirement. The completion time of the archive period defined in the archive requirement is determined by adding the "length of archive period" to a date on which the "start condition of archive period" of the archive requirement is satisfied (refer to FIG. 3). For the archive requirements for which the "start condition of archive period" is not satisfied, the completion time is undetermined. When the "start condition of archive period" of a certain archive requirement is satisfied after the electronic document is archived, the completion time of the archive period is calculated, and the value of the completion time is recorded in the item of the "applied archive requirement". A "period of current archive mode" is the period determined in step S3.

Here, the document-providing unit 126 may provide, using the information of the item of the "applied archive requirement", information of the basis of the archive mode of the electronic document (for example, a name of a rule which forms a basis), for the electronic document provided to the manager or to the user. In this case, the document-providing unit 126 identifies the currently applied archive requirement on the basis of information of the item of the "applied archive requirement", searches the archive requirement memory 110 for information such as the rule name and base section of each identified archive requirement, and provides the found information.

FIG. 9 shows management information as of, for example, Jan. 22, 2007. At this point, the completion times of all archive periods for all applied archive requirements are established for the document having a document ID of 000001. For the document having a document ID of 022983, on the other hand, only the completion time of the archive period mandated by the archive requirement 1 is established.

The items of the management information shown in FIG. 9 are only exemplary. Among the items, items other than "document type" can be determined through a calculation based on information such as the archive requirement as necessary, and, thus, these items are not necessarily recorded.

As described, in the exemplary embodiment, for items which require application of a process on the electronic document among the items of the archive mode, the process is applied at the time of registration and then the processed electronic document is archived in the document-archiving device 100. In addition, for items related to continuous management after the archiving among the items of the archive mode, the archive management unit 120 continuously manages in such a manner that the requirements of the items are satisfied.

Figure 10:
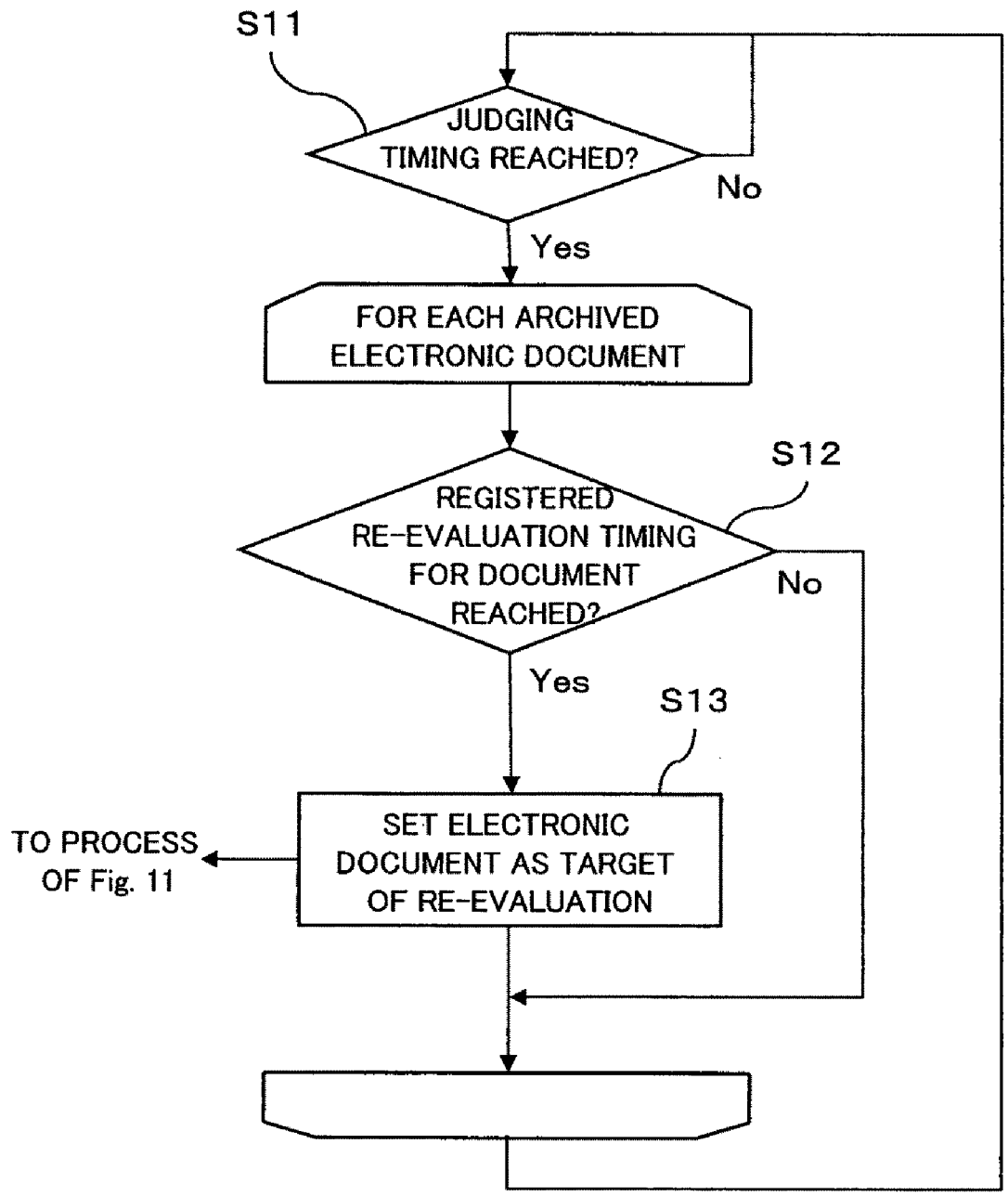
FIG. 10 is a flowchart showing a part of an example of a process in a maintenance processor.
Figure 11:
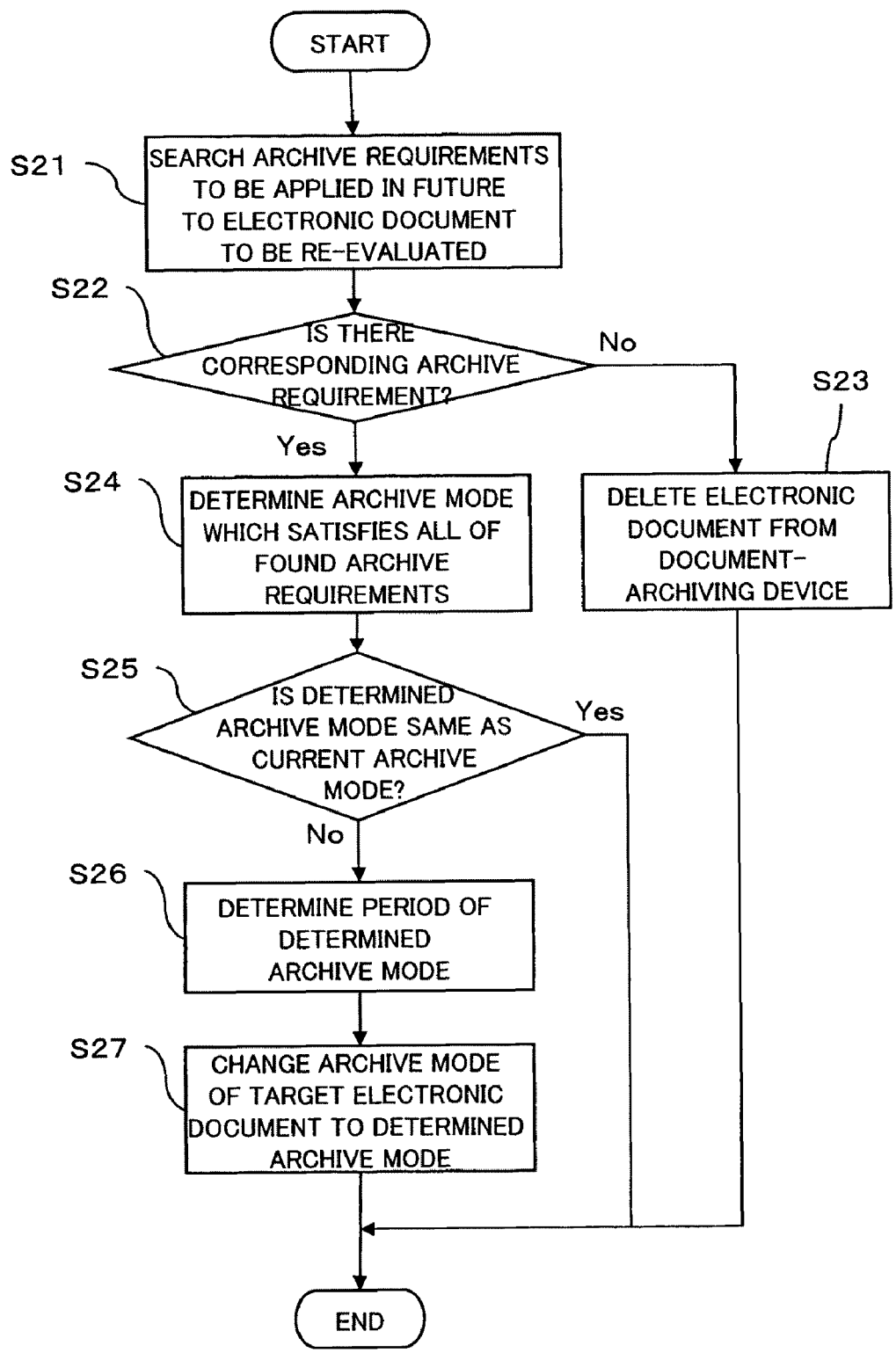
FIG. 11 is a flowchart showing a remaining part of an example of a process in a maintenance processor.

Next, by reference to FIGS. 10 and 11, an example process content of the maintenance processor 124 will be described. The maintenance processor 124 executes, every time a predefined judging timing is reached (S11), processes of steps S12-S13 on each of the electronic documents archived in the document-archiving device 100. The judging timing is defined, for example, as a periodic timing (such as every day). In step S12, the maintenance processor 124 judges whether or not a re-evaluation timing corresponding to the electronic document has been reached. The re-evaluation timing is, for example, the "period of current archive mode" shown in FIG. 9. When the maintenance processor 124 judges in step S12 that the re-evaluation timing has been reached, the process proceeds to step S13 and a process shown in FIG. 11 is executed on the electronic document as a re-evaluation target. When the maintenance processor 124 judges that the re-evaluation timing of the electronic document has not been reached, the electronic document is not re-evaluated and the process is completed.

Next, a process procedure of FIG. 11 will be described. In this procedure, the maintenance processor 124 identifies, for an electronic document judged in the process of FIG. 10 as a target of re-evaluation, an archive requirement to be applied in the future (step S21). In step S21, similar to step S1 of the procedure of FIG. 8, an archive requirement which corresponds to the document type of the electronic document and which is effective at the time of the process (that is, the time of the process falls within a period between the "application start date" of the archive requirement and the "application completion date" of the archive requirement) is searched among the archive requirements in the archive requirement memory 110. However, among the found archive requirements, archive requirements in which the completion time of the archive period mandated by the archive requirement has already elapsed are removed from the search result. The determination of whether or not the completion time of the archive period has elapsed can be made by referring to a completion time of the archive period of each archive requirement indicated in the "applied archive requirement" in the management information of the electronic document (refer to FIG. 9).

Then, the maintenance processor 124 judges whether or not one or more archive requirements are found in step S21 (step S22). If no archive requirement is found, it means that there is no longer an archive requirement for the electronic document, and, thus, the maintenance processor 124 deletes the electronic document from the document-archiving device 100 (S23).

When, on the other hand, one or more archive requirements are found, the maintenance processor 124 determines an archive mode which satisfies all of the archive requirements found in step S21 (S24). This process may be similar to step S2 of FIG. 8. Then, the maintenance processor 124 judges whether or not the determined archive mode is the same as the archive mode which is currently applied to the electronic document (S25). If the archive mode is the same, there is no need to change the archive mode, and, thus, steps S26 and S27 are skipped and the process for the electronic document is completed. If the archive modes differ from each other, on the other hand, a period of the archive mode determined in step S24 is determined (S26). This process may be similar to the process of step 3 of FIG. 8, and an earliest completion time among the completion times of the archive periods of the archive requirements forming the basis of the archive mode may be determined. The maintenance processor 124 then changes the archive mode of the electronic document to be re-evaluated to the new archive mode determined in step S24 (S27). In step S27, a process such as a data conversion is executed for the archive mode items that differ between the time before the re-evaluation and the time after the re-evaluation so that the values of the archive mode items after the re-evaluation are satisfied, and the management information (refer to FIG. 9) for the electronic document is updated in accordance with the change. Here, for example, the values of "current archive mode", "application start date of archive mode", and "period of current archive mode" are updated.

At the time of re-evaluation, because one or more of the archive requirements that had been applied to the electronic document are no longer applicable, the requirement for archiving is loosened.

As described, in the exemplary embodiment, the electronic document is archived in the document management server 10 in an archive mode which satisfies all of the archive requirements applied to the electronic document. Moreover, when any of the archive periods mandated by the archive requirements which are being applied to the archived electronic document is completed and the archive mode required for the electronic document changes, a new archive mode after the change is applied. Because the new archive mode has a looser condition as compared with the previous archive mode, the load imposed on the document management server 10 is reduced.

Figure 12:
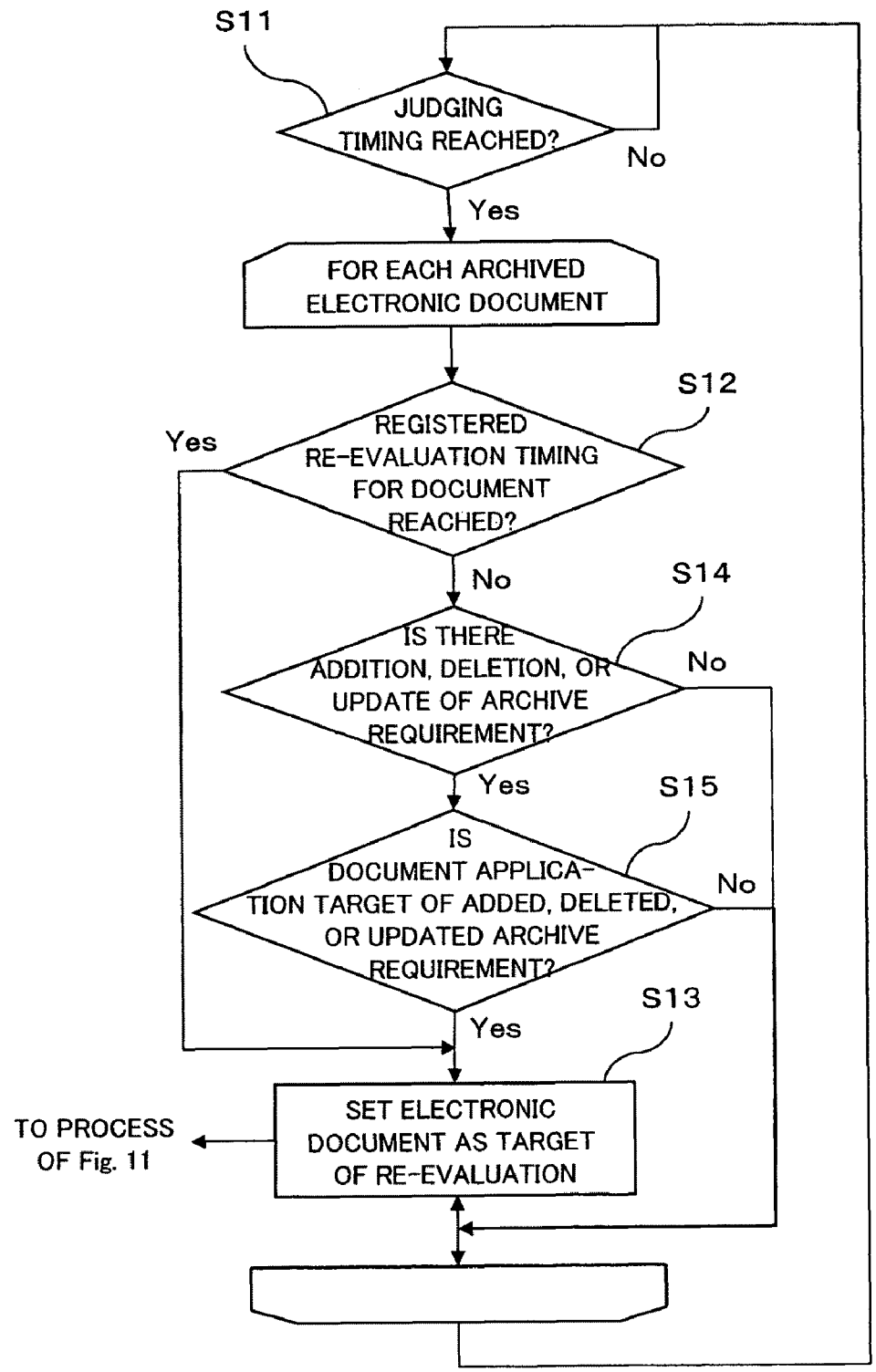
FIG. 12 is a flowchart showing an alterative example of a process in a maintenance processor.

There may be cases where a new archive requirement is added to the archive requirement memory 110 or an archive requirement stored in the archive requirement memory 110 is deleted (or invalidated) or changed. Due to such an addition, deletion, or change, the archive mode required for an electronic document which is already archived may change. FIG. 12 shows an example process procedure of the maintenance processor 124 in consideration of such a situation. In FIG. 12, steps similar to the steps in FIG. 10 are assigned the same reference numerals.

In this procedure, when a judging timing is reached, the maintenance processor 124 executes processes of steps S12-S15 for each archived electronic document. In step S12, the maintenance processor 124 judges whether or not a re-evaluation timing has been reached for the electronic document, and, when the maintenance processor 124 determines that the re-evaluation timing has not been reached, the maintenance processor 124 judges whether or not there has been an addition, deletion, or change of an archive requirement for the archive requirement memory 110 after the application start date (refer to FIG. 9) of the current archive mode for the archived document (S14). For this judgment, information on the registration date, deletion date, or most recent change date of each archive requirement may be registered in the archive requirement memory 110. The information of the registration date and the change date can be recorded when the archive management unit 130 registers, deletes, or changes an archive requirement in accordance with a request from the archive requirement manager terminal 12. When there is an archive requirement having a registration date, deletion date, or change date after the application start date, the judgment result in step S14 would be positive (Yes). When the judgment result in step S14 is negative (No), the process is completed without re-evaluating the electronic document.

When the judgment result in step S14 is positive, it is further judged whether or not there is an archive requirement which forms a basis of the archive mode which is currently applied to the electronic document, among the archive requirements that have been added, deleted, or changed (S15). The archive requirement forming the basis of the currently applied archive mode is the archive mode, among the "applied archive requirement" in the management information (refer to FIG. 9) of the electronic document, for which the completion time of the archive period has not been reached. When the judgment result in step S15 is negative; that is, when there is no added, deleted, or changed archive requirement which is being applied to the electronic document, the process is completed without re-evaluating the electronic document. When, on the other hand, there is an archive requirement which is being applied to the electronic document among the added, deleted, or changed archive requirements, the maintenance processor 124 proceeds to step S13 and executes the process of FIG. 11 with the electronic document as a re-evaluation target.

In the above-described example configuration, archive requirements based on a public rule such as laws and regulations and archive requirements based on a public rule such as an in-company rule are handled uniformly and the strictest requirement is applied, but such a configuration is not a necessity. The archive requirements include those that must be complied with (mandatory requirements) and those that are desirably complied with, but are not mandatory (non-mandatory requirements). For the archive requirements based on the public rule, it is publicly established whether a requirement is a mandatory requirement or a non-mandatory requirement (for example, defined in laws and regulations), and no private organization can change this status for the organization's convenience. For the archive requirement based on the private rule, on the other hand, the organization defining the rule can define whether the requirement is a mandatory requirement or a non-mandatory requirement. Because the non-mandatory requirement is not a necessity, the organization itself operating the document management system can judge whether or not such a requirement is to be complied with. For example, when a cost reduction is desired for document archiving due to an economic reason, one choice may be to not comply with the non-mandatory requirements. For example, a policy of the organization for the document archiving may be defined as follows.

(A) The mandatory requirements are complied with, but the non-mandatory requirements are ignored (this policy only considers the mandatory requirements, and, thus, imposes a low load on the system).

(B) The mandatory requirements and the non-mandatory requirements are handled uniformly and a strictest requirement is applied among the requirements (this policy gives a higher priority to satisfying all requirements and is equivalent to the above-described exemplary embodiment).

(C) When there is a mandatory requirement and a non-mandatory requirement for a same item, the mandatory requirement is applied with a higher priority regardless of which of the requirements is stricter. For items that have only one of the mandatory requirement and the non-mandatory requirement, the existing requirement is applied (the system load can be reduced as compared with policy (B) within a range not violating the obligation).

In order to realize a process according to these policies, for example, an attribute item indicating whether the archive requirement is a mandatory requirement or a non-mandatory requirement may be attached to each set of archive requirement data in the archive requirement memory 110 of the document management server 10. In addition, the registration processor 122 and the maintenance processor 124 may switch the processes of steps S2 and S24 in the procedure of FIG. 11 in accordance with the designated policy. For example, when the policy (A) is employed, an archive requirement, among the archive requirements found in step S1 or step S21, corresponding to the mandatory requirement can be identified, and an archive mode which satisfies all of the mandatory requirements can be determined. In the case of policy (B), an archive mode which satisfies all of the found archive requirements can be determined. In the case of policy (C), for each item of the archive mode, archive modes which define the item are searched among the found archive requirements, and, when the found archive requirements include both the mandatory requirement and the non-mandatory requirement, the value of the mandatory requirement is used as the value of that item. The archive management unit 120 may provide a user interface for designating a policy. The user interface displays, for example, a list of selectable policies, and a manager or the like may designate from the list a policy which suits the situation of the organization.

For example, when all of the archive requirements based on public rules which define an item of a certain archive mode are non-mandatory requirements, there may be cases where reduction in the load of the cost is of a higher priority as compared with compliance with all of the non-mandatory requirements, from the viewpoint of economics. In such a case, a mandatory requirement which defines, as a value of the item, a looser condition as compared with the non-mandatory requirements may be registered as an in-company rule and the policy (C) may be employed.

Alternatively, as another method for reducing the load of the cost for archiving when all of the archive requirements based on public rules are non-mandatory requirements, the following method may be considered. In this method, among the items of the archive mode, when a value different from that of the requirement based on the public rule is to be employed, an archive requirement by an in-company rule for the item is registered as an exemption rule. Then, when the archive mode of the document is determined, an archive mode which satisfies the archive requirements based on the public rules is determined, and then, an exemption rule is searched, among the exemption rules, which matches the type of the document. When there is such an exemption rule, a value of a part of the items of the archive mode is changed in accordance with the exemption rule.

Figure 13:
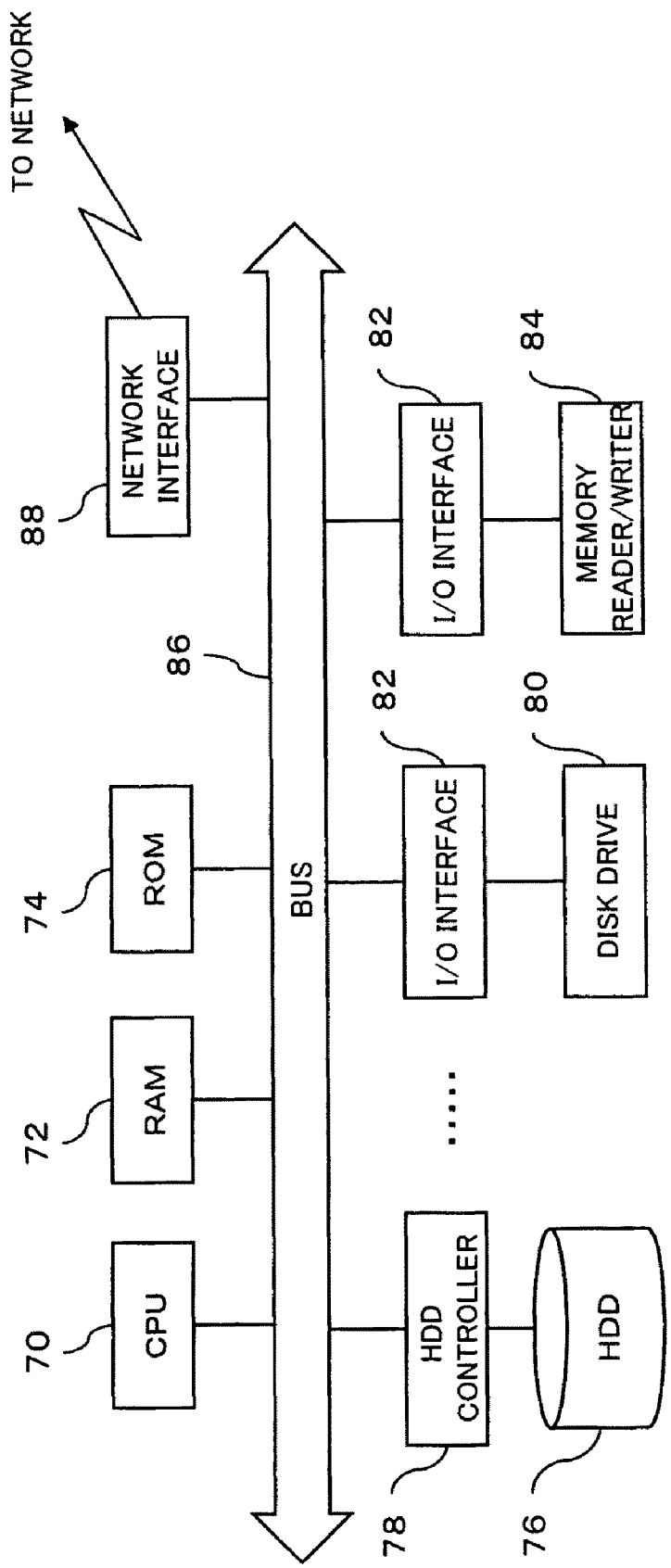
FIG. 13 is a diagram showing an example of a hardware structure of a computer.

The document management server 10 of the above-described exemplary embodiment may be realized by executing, on a computer, a program which describes a function or process content of the above-described units 100-140. As shown in FIG. 13, the computer may have, as hardware, a circuit structure in which a microprocessor such as a CPU 70, a memory (primary storage) such as a random access memory (RAM) 72 and a read-only memory (ROM) 74, an HDD controller 78 which controls an HDD (hard disk drive) 76, various I/O (input/output) interfaces 82, a network interface 88 for controlling connection with a network such as a local area network, etc., are connected via a bus 86. A disk drive 80 for reading from and/or writing to a transportable disk recording medium such as a CD and a DVD, a memory reader/writer 84 for reading from and/or writing to a transportable nonvolatile recording medium of various standards such as a flash memory, etc. may be connected via the I/O interface. A program describing the process content of the exemplary embodiment is stored in a fixed memory such as a hard disk drive through a recording medium such as the CD and DVD or through a communication means such as a network, and is installed in a computer. The program stored in the fixed memory is read into the RAM 72 and is executed by the microprocessor such as the CPU 70, to realize the process of the exemplary embodiment. A part or all of the units 100-140 of the document management server 10 may be constructed as a hardware circuit such as an ASIC (Application Specific Integrated Circuit) or FPGA (Field Programmable Gate Array). Alternatively, the units 100-140 of the document management server 10 may be distributively placed on multiple computers. Similarly, each of the other terminals 12-18 may be realized by means of a computer.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with various modifications as are suited to the particular use contemplated. It is intended that the scope of the invention be defined by the following claims and their equivalents.

What is claimed is:

1. A computer-readable medium storing a program causing a computer to execute a process for controlling archiving of an electronic document, the program causing the computer to function as:

a memory that stores information related to a plurality of electronic document archival rules, that stores, for each electronic document archival rule, a document type to which the electronic document archival rule is applied and one or a plurality of archive mode item values which follow the electronic document archival rule, and that stores, for each archive mode item, an order relationship of strictness among the plurality of archive mode item values;

an acquisition unit that acquires a document type of a target electronic document to be archived; and an archive processor that applies a process to archive the target electronic document in an archive device according to one or a plurality of electronic document archival rules corresponding to the document type of the target electronic document on the basis of the information stored in the memory, wherein when a plurality of electronic document archival rules correspond to the document type of the target electronic document and a plurality of different archive mode item values are stored for the same archive mode item in the plurality of electronic document archival rules, the strictest archive mode item value is determined according to the order relationship of strictness among the plurality of different archive mode item values for the archive mode item and the target electronic document is archived by an archiving method indicated by the determined strictest archive mode item value, wherein the memory stores, in correlation to each of the electronic document archival rules, completion time information which defines a completion time of an archive period when the electronic document to be archived is archived according to an archiving method indicated by the archive mode item value corresponding to the electronic document archival rule;

the archive processor stores, among completion times defined on the basis of the completion time information corresponding to the electronic document archival rules corresponding to the document type acquired by the acquisition unit, an earliest time as a re-determination time in correlation to the electronic document to be archived and executes, when a re-determination time stored in correlation to the electronic document archived in the archive device is reached, a re-determination process of the archive mode item value for an electronic document correlated to the re-determination time, and the re-determination process is a process in which the strictest archive mode item value in the order relationship is determined from among archive mode item values, in the archive mode item values corresponding to the electronic document archival rules corresponding to the document type of an electronic document which is a target of the re-determination process, having the completion time of the archive period defined by the completion time information later than a time of execution of the re-determination process, and, when the determined archive mode item value differs from the archive mode item value applied to the electronic document archived in the archive device at the time of the process, the electronic document is re-archived according to an archiving method indicated by the archive mode item value determined by the re-determination process, 2. The computer-readable medium according to claim 1, wherein the archive processor deletes the electronic document from the archive device where there is no archive mode item value in which the completion time of the archive period defined by the completion time information is later than the time of execution of the re-determination process in the archive mode item values corresponding to the electronic document archival rules corresponding to the document type of the electronic document which is the target of the re-determination process at the time of execution of the re-determination process.

3. A computer-readable medium storing a program causing a computer to execute a process for controlling archiving of an electronic document, the program causing the computer to function as:

a memory that stores information related to a plurality of electronic document archival rules, that stores, for each electronic document archival rule, a document type to which the electronic document archival rule is applied and one or a plurality of archive mode item values which follow the electronic document archival rule, and that stores, for each archive mode item, an order relationship of strictness among the plurality of archive mode item values;

an acquisition unit that acquires a document type of a target electronic document to be archived; and an archive processor that applies a process to archive the target electronic document in an archive device according to one or a plurality of electronic document archival rules corresponding to the document type of the target electronic document on the basis of the information stored in the memory, wherein when a plurality of electronic document archival rules correspond to the document type of the target electronic document and a plurality of different archive mode item values are stored for the same archive mode item in the plurality of electronic document archival rules, the strictest archive mode item value is determined according to the order relationship of strictness among the plurality of different archive mode item values for the archive mode item and the target electronic document is archived by an archiving method indicated by the determined strictest archive mode item value, wherein when a stored content of the memory is changed by an addition of an archive mode item value corresponding to a new electronic document archival rule to the memory, a deletion of an archive mode item value corresponding to an already-existing electronic document archival rule from the memory, or a change of an archive mode item value corresponding to an already-existing electronic document archival rule stored in the memory, the archive processor finds, for an electronic document archived in the archive device, an archive mode item value corresponding to one or more electronic document archival rules corresponding to the document type of the electronic document from the memory after the stored content is changed, determines the strictest archive mode item value in the order relationship in the found archive mode item values corresponding to the one or more electronic document archival rules, and re-archives the electronic document in the archive device according to an archiving method indicated by the determined archive mode item value.

4. A computer-readable medium storing a program causing a computer to execute a process for controlling archiving of an electronic document, the program causing the computer to function as:

a memory that stores information related to a plurality of electronic document archival rules, that stores, for each electronic document archival rule, a document type to which the electronic document archival rule is applied and one or a plurality of archive mode item values which follow the electronic document archival rule, and that stores, for each archive mode item, an order relationship of strictness among the plurality of archive mode item values;

an acquisition unit that acquires a document type of a target electronic document to be archived; and an archive processor that applies a process to archive the target electronic document in an archive device according to one or a plurality of electronic document archival rules corresponding to the document type of the target electronic document on the basis of the information stored in the memory, wherein when a plurality of electronic document archival rules correspond to the document type of the target electronic document and a plurality of different archive mode item values are stored for the same archive mode item in the plurality of electronic document archival rules, the strictest archive mode item value is determined according to the order relationship of strictness among the plurality of different archive mode item values for the archive mode item and the target electronic document is archived by an archiving method indicated by the determined strictest archive mode item value, wherein the archive mode item values stored in the memory for each of the electronic document archival rules include a first archive mode item value which indicates an archiving method for archiving an electronic document in a first archive device which is connected to the computer at all times and a second archive mode item value which indicates an archiving method for archiving an electronic document in a second archive device which can be attached to and detached from the computer, and the first archive mode item value is defined as being stricter than the second archive mode item value in the order relationship.

5. A document management system comprising:

a memory that stores information related to a plurality of electronic document archival rules that stores for each electronic document archival rule a document type to which the electronic document archival rule is applied and one or a plurality of archive mode item values which follow the electronic document archival rule, and that stores, for each archive mode item, an order relationship of strictness among the plurality of archive mode item values;

an acquisition unit that acquires a document type of a target electronic document to be archived; and an archive processor that applies a process to archive the target electronic document in an archive device according to one or a plurality of electronic document archival rules corresponding to the document type of the target electronic document on the basis of the information stored in the memory, wherein when a plurality of electronic document archival rules correspond to the document type of the target electronic document and a plurality of different archive mode item values are stored for the same archive mode item in the plurality of electronic document archival rules, the strictest archive mode item value is determined according to the order relationship of strictness among the plurality of different archive mode item values for the archive mode item and the target electronic document is archived by an archiving method indicated by the determined strictest archive mode item value, wherein the memory stores, in correlation to each of the electronic document archival rules, completion time information which defines a completion time of an archive period when the electronic document to be archived is archived according to an archiving method indicated by the archive mode item value corresponding to the electronic document archival rule;

the archive processor stores, among completion times defined on the basis of the completion time information corresponding to the electronic document archival rules corresponding to the document type acquired by the acquisition unit, an earliest time as a re-determination time in correlation to the electronic document to be archived and executes, when a re-determination time stored in correlation to the electronic document archived in the archive device is reached, a re-determination process of the archive mode item value for an electronic document correlated to the re-determination time, and the re-determination process is a process in which the strictest archive mode item value in the order relationship is determined from among archive mode item values, in the archive mode item values corresponding to the electronic document archival rules corresponding to the document type of an electronic document which is a target of the re-determination process, having the completion time of the archive period defined by the completion time information later than a time of execution of the re-determination process, and, when the determined archive mode item value differs from the archive mode item value applied to the electronic document archived in the archive device at the time of the process, the electronic document is re-archived according to an archiving method indicated by the archive mode item value determined by the re-determination process.

* * * * *